Dec. 11, 1934.   L. A. GEBHARD ET AL   1,983,540
BALANCING CONDENSER
Filed April 8, 1933    3 Sheets-Sheet 1
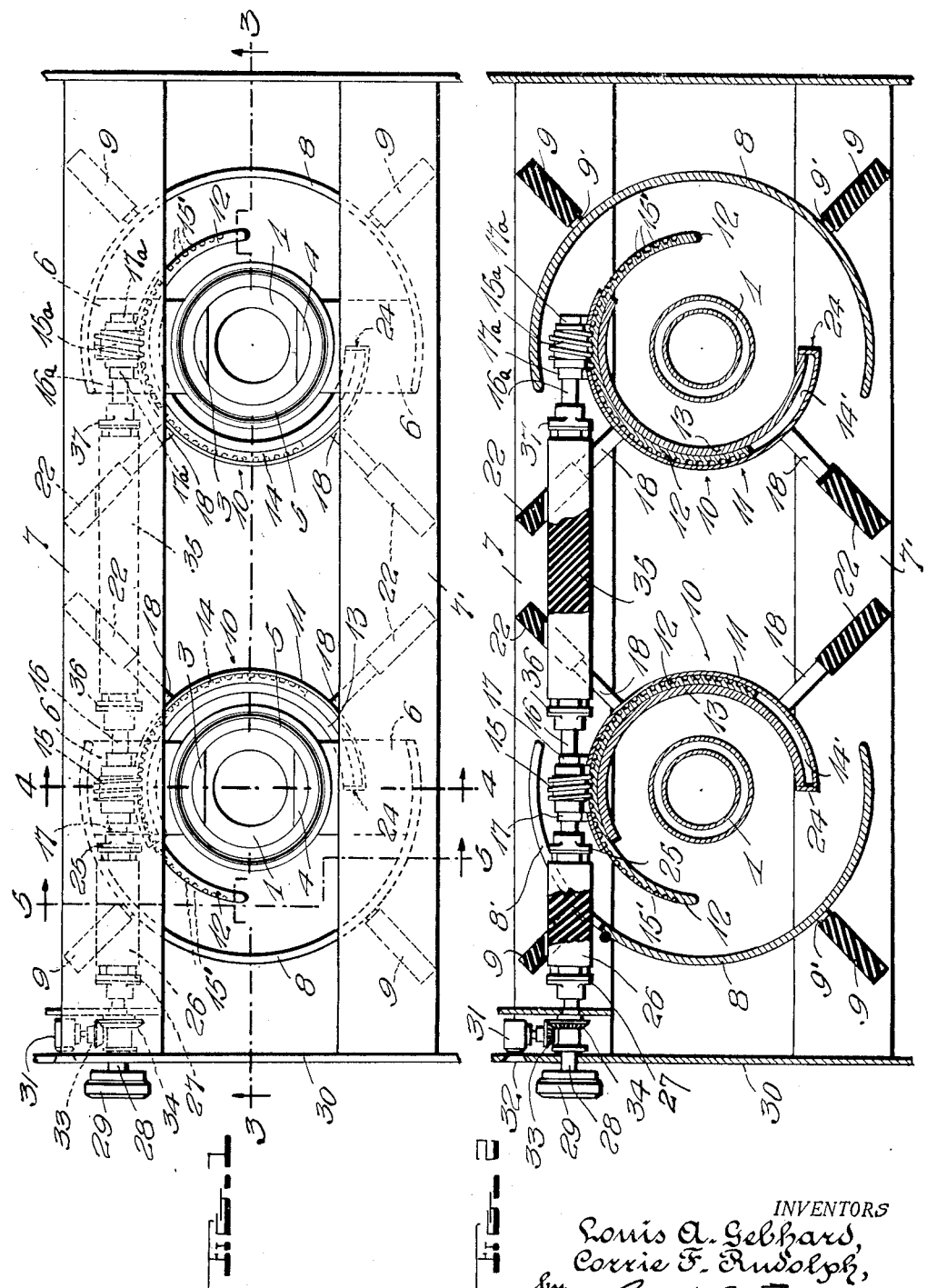
INVENTORS
Louis A. Gebhard,
Corrie F. Rudolph,
by Robert A. Lavender
ATTORNEY.

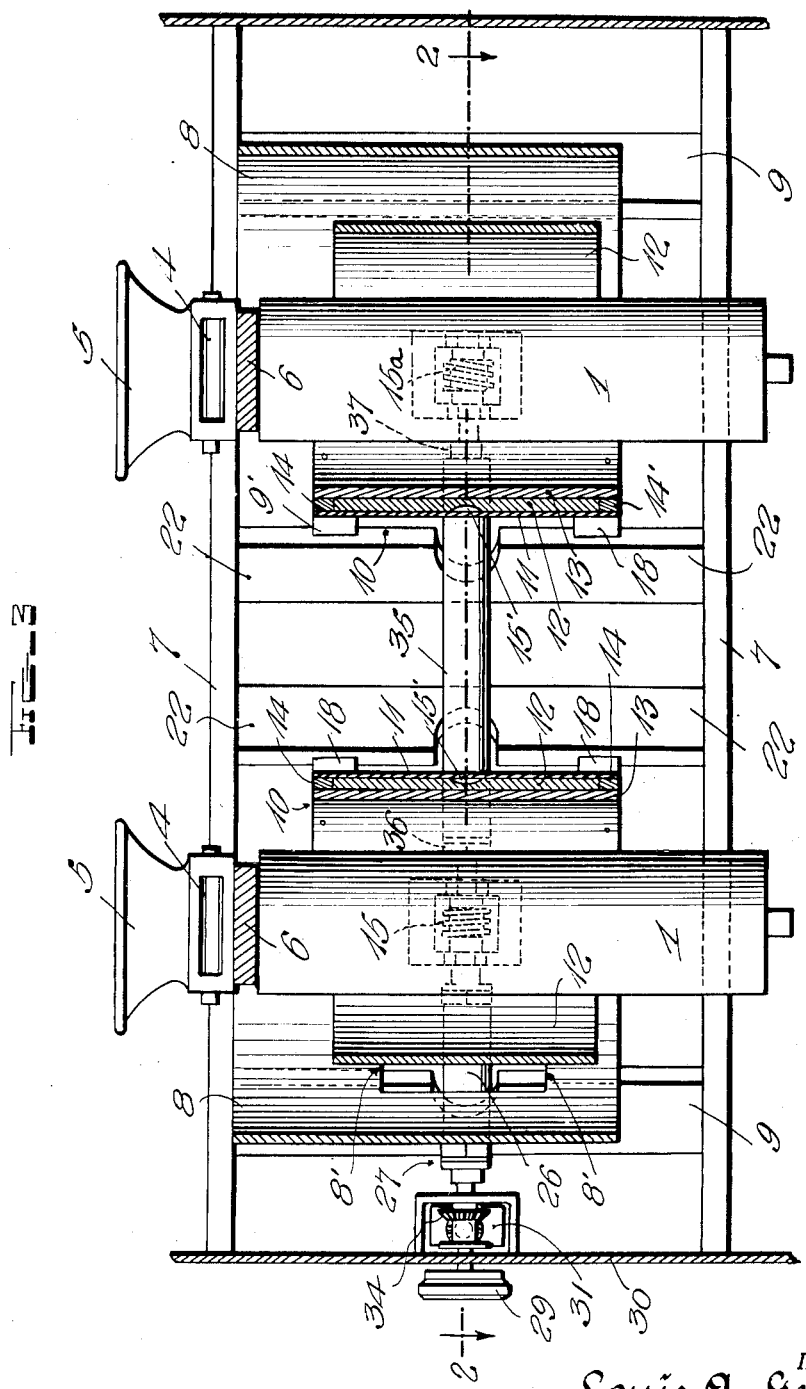

Dec. 11, 1934.   L. A. GEBHARD ET AL   1,983,540
BALANCING CONDENSER
Filed April 8, 1933   3 Sheets-Sheet 3
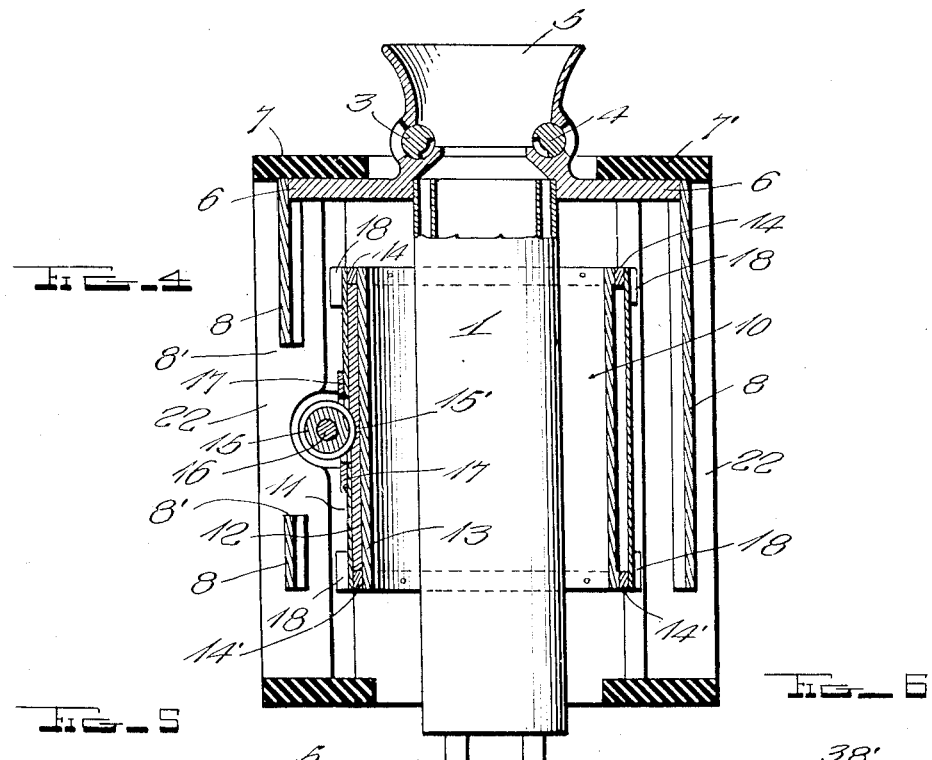
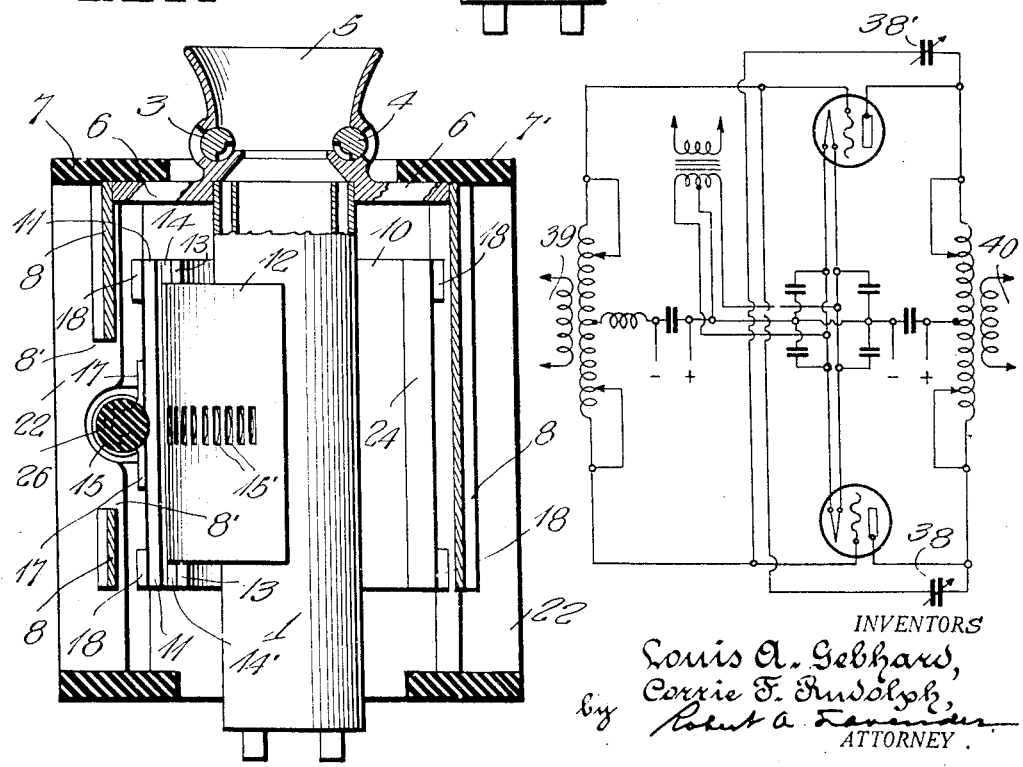
INVENTORS
Louis A. Gebhard,
Corrie F. Rudolph,
by Robert A. Lavender
ATTORNEY.

Patented Dec. 11, 1934

1,983,540

UNITED STATES PATENT OFFICE 1,983,540

BALANCING CONDENSER

Louis A. Gebhard and Corrie F. Rudolph, Washington, D. C.

Application April 8, 1933, Serial No. 665,182

17 Claims. (Cl. 250—16)

(Granted under the act of March 3, 1883, as amended April 30, 1928; 370 O. G. 757)

Our invention relates broadly to high frequency signaling systems and more particularly to a construction of balancing condenser for use in high frequency signal transmitting apparatus.

One of the objects of our invention is to provide a compact and efficient construction of balance condensers for use in high frequency transmission circuits.

Another object of our invention is to provide a construction of balance condenser which is capable of assembly in concentric relation to the high power tube jackets of a radio transmitter.

Still another object of our invention is to provide a construction of balance condenser which is electrically shielded from external influences and which eliminates excessive distributed capacity from the transmission circuits.

A still further object of our invention is to provide a structure of balance condenser which readily lends itself to installation in push pull amplifier circuits where simultaneous adjustment of a pair of the balance condensers is effected.

Another object of our invention is to provide a construction of balance condenser for signal transmitters which does not tend to impose undesirable restrictions upon the upper range of the frequency band over which the transmitter is operative.

Other and further objects of our invention reside in the construction and arrangement of parts for a balance condenser as set forth more fully in the specification hereinafter following by reference to the accompanying drawings, in which:

Figure 1 is a top plan view of the balance condenser of our invention; Fig. 2 is a horizontal sectional view taken through the balance condenser on line 2—2 of Fig. 3; Fig. 3 is a central vertical longitudinal sectional view through the condenser on line 3—3 of Fig. 1; Figs. 4 and 5 are transverse vertical sectional views taken on lines 4—4 and 5—5 respectively of Fig. 1; and Fig. 6 shows the application of the balance condenser construction of our invention to the push pull power amplifier circuit of a radio transmitter.

In an amplifier for high power high frequency work, a balance condenser of a compact type is desirable to prevent excessive distributed capacities and therefore, limitation of the frequency on the upper end range over which the system is operable. It is desirable to shield such condenser against outside electrical influences, and also to keep out dust and water, on account of spilling in case of water cooled tubes. Such a balance condenser should provide a maximum amount of insulation with a minimum amount of space since the condenser is subjected to the highest potential of any part of the amplifier circuit. It must sustain the direct current voltage of grid and plate which are additive as well as the radio frequency voltages which are also additive with respect to each other and to the direct current voltages. Moreover the balance condenser must be readily adjustable with potentials on the system over a range required for balancing tubes at the frequencies covered by the transmitter. Sufficient latitude of adjustment must be provided to cover variations of inter-element capacities of tubes such as are found with tolerances used in commercial manufacture. The balancing capacity required differs somewhat with frequency and sufficient latitude of adjustment must be provided to cover this.

Referring to the drawings in detail, reference character 1 indicates a water cooled tube jacket for a high power tube of the depending cylindrical anode type in a high power radio transmitter. This jacket has a smooth cylindrical outer surface. Means for fastening and ejecting the tube are shown at 3 and 4. An electrostatic shield is shown at 5 and may be cast integral with the part supporting 3, 4 and the lower part of the jacket. Arms 6 which are preferably integral with 5 project outwardly from the jacket forming a horizontal support. The arms 6 are fastened to horizontal insulated members 7 and 7' which are in turn fastened at both ends to the frame of the radio transmitter. Segmental sections of cylinders 8 are fastened at their top to the arms 6 and at their side to vertical insulating members 9 by appropriate feet 9' as shown. The segmental sections of cylinders 8 with the arms 6 and jackets 5 form the fixed electrodes of the balance condenser.

The variable electrode of the balance condenser is formed by a group of segmental cylinders 10, concentric with respect to the jacket and outer cylinder 8. The group consists of three segmental cylinders 11, 12 and 13. The outer cylinder 11 and inner cylinder 13 are fastened together by upper and lower spacers 14 and 14'. The middle cylinder 12 slides between 11 and 13 which act as guides for the cylinder. Actuation is caused by the rotation of worm wheel 15 engaging teeth 15' cut into the outer surface of the cylinder 12. The worm 15 passes through a cut away portion in cylinder 11 in order to accomplish this. A worm 15 is mounted on a shaft 16 rotating in bearings 17 which are fastened to the wall of cylinder 11. The group of cylinders is supported at four points with appropriate spacers as at 18, projecting from vertical insulating members 22. The edge of the outer cylinder 11 is turned over to form a stop for cylinder 12 as shown at 24. Part of one of the cylinders 8 is cut away as shown to prevent electrical breakdown at points designated at 8'. The cut 8' is arranged to have the same electrical clearance as the spacing between the fixed and adjustable plates forming the two electrodes of the condenser. All sharp points and edges are preferably rounded off to prevent concentration of the electric field and breakdown.

The adjustment of the condenser is accomplished by turning shaft 16 through universal joint 25, insulating member 26, universal joint 27, shaft 28 and knob 29. Knob 29 is located in front of the panel 30 of the radio transmitter. A counter 31 visible through an opening 32 in the front panel 30 is mechanically connected to shaft 28 by means of gears 33 and 34 and serves as a means of indicating the adjustment of the condenser.

Two units of the balance condenser and the tube jackets may be grouped to form a double system suitable for a push-pull connection as shown in Figs. 1, 2 and 3. The second unit may be simultaneously controlled through insulating member 35 and universal joints 36 and 37.

The connections of the push-pull group may be as shown in Fig. 6 in which diagram the condensers are shown at 38 and 38'. The input to the amplifier is shown at 39 and the output is indicated at 40.

In order to simplify illustration of our invention, the two units have been given similar reference characters. However, the units are not identical in construction as they are distinctly right and left assemblies. That is to say, the concave side of the outside capacity area of one balance condenser is disposed adjacent the concave side of the outside capacity area of the other balance condenser. The internal capacity area of the balance condensers have their convex sides adjacent each other. The movable cylinder members 12 of the balance condensers are coordinated in operation so that the effective capacity of each balance condenser increases or decreases simultaneously. In the arrangement of the units, as shown, the movable cylindrical members 12 rotate one in a clockwise direction and the other in a counterclockwise direction upon movement of control knob 29. This is made possible by providing a worm 15a for the second unit mounted on shaft 16a and rotating in bearing 17a where the pitch of worm 15a is directly opposite to the pitch of worm 15. Therefore, as control knob 29 is rotated imparting rotary motion to universal joint 27, insulating member 26, universal joint 25, shaft 16, universal joint 36, insulating member 35, universal joint 37, shaft 16a, and worm 15a, the effect is that worm 15 engages teeth in movable cylinder 12 of one unit while worm 15a engages teeth in the movable cylinder 12 of the other unit and imparts to the movable units rotative forces in opposite directions. In this way, an extremely compact form of symmetrical tuning unit is provided for simultaneously increasing or decreasing capacity in each of the units under one control. The slot 8' in the external capacity area 8 of one of the units permits the passage of the control shaft through the capacity area 8 where the insulating member 26 is substantially spaced from the edges of the slot. The vertical insulating members 9 and 22, constituting the frame structure, are each cut away to allow the passage of insulating member 26 and insulating member 35, is shown. The inner capacity areas are supported by feet 18 from the vertically extending insulating frame members 22, as illustrated. The loss of capacity area, by reason of the cut away portion 8' in the capacity area 8 of one of the units, is compensated for by a difference in initial setting of movable element 12 of one unit as compared to the movable element 12 of the adjacent unit.

The balancing condenser system of our invention has proven highly successful in high frequency transmitters, particularly in preventing excessive distributed capacities and avoiding limitations of the frequency on the upper end of the frequency spectrum over which the transmitter is operative. While we have described our invention in certain preferred embodiments, we desire it understood that modifications may be made and that no limitations upon our invention are intended other than are imposed by the scope of the appended claims.

The invention herein described may be manufactured and used by or for the Government of the United States of America for governmental purposes without the payment of any royalty thereon or therefor.

What we claim as new and desire to secure by Letters Patent of the United States is as follows:

1. A balancing condenser comprising in combination with a fluid cooled metallic jacket for an electron tube, a semi-cylindrical capacity area supported in spaced relation to said metallic jacket, a fixed capacity area of substantially semi-cylindrical contour concentrically disposed with respect to the aforesaid capacity area and spacially related thereto, the concave sides of said semi-cylindrical capacity areas directly facing each other, said last mentioned fixed capacity area being electrically connected with said metallic jacket, and means for changing the effective area of one of said capacity areas.

2. A balancing condenser comprising in combination a metallic fluid cooled cylindrical jacket for a fluid cooled electron tube, a semi-cylindrical condenser plate electrically connected with said jacket and spaced concentrically with respect thereto, a second semi-cylindrical condenser plate mounted intermediate said cylindrical jacket and the aforesaid semi-cylindrical plate, the concave sides of said semicylindrical condenser plates directly facing each other, and means for varying the effective capacity area of said semi-cylindrical intermediate plate.

3. A balancing condenser comprising in combination a cylindrical metallic jacket for a fluid cooled electron tube, a substantially semi-cylindrical condenser plate concentrically disposed about said jacket in spaced relation thereto and electrically connected therewith, a substantially semi-cylindrical intermediate condenser plate disposed between said jacket and the aforesaid condenser plate, the concave sides of said semi-cylindrical condenser plates directly facing each other, and means for varying the effective capacity area of said intermediate condenser plate.

4. A balancing condenser comprising in combination a cylindrical metallic jacket for a fluid cooled electron tube, a substantially semi-cylindrical condenser plate concentrically disposed about said jacket in spaced relation thereto and electrically connected therewith, an intermediate condenser plate disposed between said jacket and the aforesaid condenser plate, a semi-cylindrical plate connected with said intermediate plate, said plates having their concave sides facing each other, and means for varying the positioned and overlapping relationship between said semi-cylindrical plate and said intermediate plate for effectively controlling the effective capacity relationship between said intermediate plate and said first mentioned condenser plate, the minimum effective capacity obtaining when the concave sides of said semi-cylindrical plates are directed towards each other.

5. A balancing condenser comprising in combination a cylindrical metallic jacket for a fluid cooled electron tube, a substantially semi-cylindrical condenser plate concentrically disposed about said jacket in spaced relation thereto and electrically connected therewith, an intermediate semi-cylindrical condenser plate disposed in spaced relation between said jacket and said first mentioned condenser plate, the concave side of one of said plates being directed towards the concave side of the other of said plates, a third semi-cylindrical condenser plate disposed in contact relation to said intermediate plate, and means for rotatably moving said last mentioned semi-cylindrical condenser plate for varying the capacity relation between said intermediate condenser plate, and said first mentioned condenser plate and said jacket.

6. A balancing condenser comprising in combination a cylindrical metallic jacket for a fluid cooled electron tube, a substantially semi-cylindrical condenser plate concentrically disposed about said jacket in spaced relation thereto and electrically connected therewith, an intermediate semi-cylindrical condenser plate disposed in spaced relation between said jacket and said first mentioned condenser plate, the concave sides of said plates being directed towards each other, a third semi-cylindrical condenser plate disposed in contact relation to said intermediate plate, and means extending through said first mentioned condenser plate and engaging said semi-cylindrical condenser plate for varying the capacity relation between said intermediate condenser plate, and said first mentioned condenser plate and said jacket.

7. A balancing condenser comprising a substantially cylindrical metallic plate, a substantially semi-cylindrical metallic plate, means for supporting said plates in concentric spacial relation with an electrical connection therebetween, a substantially semi-cylindrical intermediate condenser plate, means for insulatingly mounting said intermediate condenser plate with the concave side thereof directly facing the concave side of said first mentioned semi-cylindrical condenser plate, a semi-cylindrical capacity area mounted for rotative sliding movement in electrical connection with said intermediate condenser plate, and means passing through said first mentioned semi-cylindrical condenser plate and engaging said semi-cylindrical capacity area for angularly shifting the said capacity area for varying the effective capacity between said intermediate plate and said other plates.

8. A balancing condenser comprising a substantially cylindrical metallic plate, a substantially semi-cylindrical metallic plate, means for supporting said plates in concentric spacial relation with an electrical connection therebetween, a substantially semi-cylindrical intermediate condenser plate, means for insulatingly mounting said intermediate condenser plate with the concave side thereof directly facing the concave side of said first mentioned semi-cylindrical condenser plate, a semi-cylindrical capacity area mounted for rotative sliding movement in electrical connection with said intermediate condenser plate, a control shaft, a worm gear on said control shaft, means for journaling said control shaft on said intermediate condenser plate, teeth formed in said semi-cylindrical rotative sliding capacity area and coacting with said worm gear, and a coupling of insulating material connected with said shaft and passing through said first mentioned semi-cylindrical condenser plate and rotatable from the exterior thereof for effecting an angular shift in position of said rotative sliding semi-cylindrical capacity area for controlling the effective capacity between said intermediate plate and said first mentioned plates.

9. A balancing condenser comprising in combination a cylindrical fluid cooled electron tube metallic jacket, a substantially semi-cylindrical capacity area electrically connected with said metallic jacket and mounted in spaced relation thereto, and an intermediate substantially semi-cylindrical condenser plate mounted between said first mentioned condenser plate and said jacket, the concave side of said intermediate condenser plate being directed toward the concave side of said first mentioned condenser plate with said metallic jacket therebetween.

10. A balancing condenser comprising in combination a cylindrical fluid cooled electron tube metallic jacket, a substantially semi-cylindrical capacity area electrically connected with said metallic jacket and mounted in spaced relation thereto, an intermediate substantially semi-cylindrical condenser plate mounted between said first mentioned condenser plate and said jacket, the concave side of said intermediate condenser plate being directed toward the concave side of said first mentioned condenser plate with said metallic jacket therebetween, a substantially semi-cylindrical capacity area slidably mounted on said intermediate condenser plate, and means for varying the overlapping relation of said semi-cylindrical capacity area with respect to said intermediate condenser plate for correspondingly controlling the effective capacity relationship between said jacket and said first mentioned condenser plate, and said intermediate condenser plate.

11. A balancing condenser comprising in combination a cylindrical fluid cooled electron tube metallic jacket, a substantially semi-cylindrical capacity area electrically connected with said metallic jacket and mounted in spaced relation thereto, an intermediate substantially semi-cylindrical condenser plate mounted between said first mentioned condenser plate and said jacket, the concave side of said intermediate condenser plate being directed toward the concave side of said first mentioned condenser plate with said metallic jacket therebetween, a substantially semi-cylindrical capacity area slidably mounted on said intermediate condenser plate, and means extending through said first mentioned condenser plate and engaging said semi-cylindrical slidable capacity area for varying the overlapping relation between said slidable capacity area and said intermediate condenser plate for correspondingly controlling the capacity between said first mentioned condenser plate and said jacket, and said intermediate condenser plate.

12. In a symmetrical balancing condenser system, a pair of high frequency units, each of said units comprising a cylindrical condenser plate, a substantially semi-cylindrical condenser plate spaced from but electrically connected with said cylindrical condenser plate, the semi-cylindrical condenser plate of one unit having its concave side directed toward the concave side of the semi-cylindrical condenser plate of the other of said units, an intermediate semi-cylindrical condenser plate for each of said units, said intermediate semi-cylindrical condenser plates of each unit having the convex side thereof directly opposite each other, and means for simultaneously controlling the effective capacity areas of each of said intermediate plates.

13. In a symmetrical balancing condenser system, a frame structure, a pair of high frequency units each comprising a fluid cooled electron tube cylindrical metallic jacket disposed in parallel vertical axes in said frame structure, a pair of semi-cylindrical condenser plates mounted in opposed relation on the opposite sides of each of said jackets, a semi-cylindrical condenser plate disposed in slidable contact relation with one of the condenser plates of each unit, and means for simultaneously controlling the angular adjustment of said slidable semi-cylindrical condenser plates of each unit.

14. High frequency apparatus comprising a frame structure, a pair of high frequency units mounted therein, each of said units including a fluid cooled electron tube metallic jacket, a substantially semi-cylindrical capacity area electrically connected therewith but spacially related with respect thereto, the said semi-cylindrical capacity area of one unit having its concave side directly facing the concave side of the semi-cylindrical capacity area of the adjacent unit, an intermediate capacity area comprising a semi-cylindrical plate, the intermediate plate of one unit having the convex side thereof adjacent the convex side of the intermediate plate of the other unit, a semi-cylindrical capacity area slidably engaging said intermediate plate, and means for simultaneously controlling the angular position of the semi-cylindrical capacity area in each of said units.

15. High frequency apparatus comprising a frame structure, a pair of high frequency units mounted therein, each of said units including a fluid cooled electron tube metallic jacket, a substantially semi-cylindrical capacity area electrically connected therewith but spacially related with respect thereto, the said semi-cylindrical capacity area of one unit having its concave side directly facing the concave side of the semi-cylindrical capacity area of the adjacent unit, an intermediate capacity area comprising a semi-cylindrical plate, the intermediate plate of one unit having the convex side thereof adjacent the convex side of the intermediate plate of the other unit, a semi-cylindrical capacity area slidably engaging said intermediate plate, and means rotatably engaging the slidable capacity area of each of said units for imparting rotative movement to one of said capacity areas in a clockwise direction and corresponding movement to the slidable capacity area of the other of said units in a counterclockwise direction.

16. In a balancing condenser, a cylindrical condenser plate, a substantially semi-cylindrical condenser plate electrically connected therewith and mounted in spaced relation with respect thereto, a substantially semi-cylindrical intermediate condenser plate having the concave side thereof directly facing the concave side of said first mentioned semi-cylindrical condenser plate, said intermediate condenser plate comprising a pair of spaced semi-cylindrical surfaces, a semi-cylindrical capacity area slidable in surface contact between said spaced semi-cylindrical surfaces, one of said spaced semi-cylindrical surfaces being apertured, a worm gear having teeth projecting through the apertured portion of said spaced surface and engaging teeth cut in said slidable semi-cylindrical capacity area, and means for rotatably driving said worm gear for imparting rotative movement to said slidable semi-cylindrical capacity area for varying the effective capacity relationship between said intermediate plate, said cylindrical plate and said first mentioned semi-cylindrical plate.

17. In a balancing condenser, a cylindrical condenser plate, a substantially semi-cylindrical condenser plate electrically connected therewith and mounted in spaced relation with respect thereto, a substantially semi-cylindrical intermediate condenser plate having the concave side thereof directly facing the concave side of said first mentioned semi-cylindrical condenser plate, said intermediate condenser plate comprising a pair of spaced semi-cylindrical surfaces, a semi-cylindrical capacity area slidable in surface contact between said spaced semi-cylindrical surfaces, one of said spaced semi-cylindrical surfaces being apertured, a worm gear having teeth projecting through the apertured portion of said spaced surface and engaging teeth cut in said slidable semi-cylindrical capacity area, and driving means extending through said first mentioned semi-cylindrical capacity area but insulated therefrom for imparting rotative movement to said worm gear for correspondingly adjusting the position of said slidable semi-cylindrical capacity area for controlling the effective capacity between said intermediate plate, and said cylindrical plate and said first mentioned substantially semi-cylindrical plate.

LOUIS A. GEBHARD.
CORRIE F. RUDOLPH.